United States Patent
Yanagisawa (10) Patent No.: US 9,581,841 B2
(45) Date of Patent: Feb. 28, 2017

(54) DISPLAY DEVICE

(71) Applicant: Japan Display Inc., Tokyo (JP)

(72) Inventor: Syou Yanagisawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 314 days.

(21) Appl. No.: 14/109,990

(22) Filed: Dec. 18, 2013

(65) Prior Publication Data

US 2014/0176844 A1 Jun. 26, 2014

(30) Foreign Application Priority Data

Dec. 20, 2012 (JP) ................................. 2012-278310

(51) Int. Cl.
| | |
|---|---|
| *G02F 1/1339* | (2006.01) |
| *G02F 1/13* | (2006.01) |
| *G09G 3/00* | (2006.01) |
| *G02F 1/1362* | (2006.01) |

(52) U.S. Cl.
CPC ............ *G02F 1/1309* (2013.01); *G09G 3/006* (2013.01); *G02F 1/1339* (2013.01); *G02F 2001/136254* (2013.01); *G09G 2300/0426* (2013.01)

(58) Field of Classification Search
CPC ....... G02F 1/1309; G02F 2001/136254; G02F 1/136259; G02F 2001/136263; G02F 2001/136272
See application file for complete search history.

(56) References Cited

U.S. PATENT DOCUMENTS

| | | | |
|---|---|---|---|
| 7,649,585 B2 * | 1/2010 | Jeoung | G02F 1/1309 349/187 |
| 2004/0207772 A1 * | 10/2004 | Tomita | G09G 3/006 349/42 |
| 2005/0157243 A1 | 7/2005 | Hayata et al. | |
| 2008/0001885 A1 | 1/2008 | Yanagisawa et al. | |
| 2009/0096770 A1 | 4/2009 | Kawabe | |
| 2011/0310343 A1 * | 12/2011 | Ueda | G02F 1/13452 349/149 |

(Continued)

FOREIGN PATENT DOCUMENTS

| | | |
|---|---|---|
| JP | 2006-171386 A | 6/2006 |
| JP | 2007-171993 | 7/2007 |

(Continued)

OTHER PUBLICATIONS

Japanese Office Action issued on Aug. 30, 2016 for corresponding Japanese Patent Application No. 2012-278310.

*Primary Examiner* — Jessica M Merlin
*Assistant Examiner* — Mark Teets
(74) *Attorney, Agent, or Firm* — Typha IP LLC (57) ABSTRACT

A display device is configured to provide a crack detection line running from a first crack detection terminal along a side of a TFT substrate to extend to a second crack detection terminal. A switching transistor for switching between an image display and crack detection is provided at a side opposite a terminal portion between the crack detection line and a video signal line. The crack that may cause disconnection in the crack detection line is detected by turning the switching transistor on, and applying the voltage for lighting inspection to the first crack detection terminal and the second crack detection terminal sequentially in this order.

7 Claims, 8 Drawing Sheets

(56) References Cited

U.S. PATENT DOCUMENTS

2012/0257132 A1* 10/2012 Kitajima .......... G02F 1/133512
349/42

FOREIGN PATENT DOCUMENTS

| | | |
|---|---|---|
| JP | 2008-9246 | 1/2008 |
| JP | 2008-009246 A | 1/2008 |
| JP | 2009-92965 | 4/2009 |
| JP | 2011-158707 A | 8/2011 |

* cited by examiner

DISPLAY DEVICE

CLAIM OF PRIORITY

The present application claims priority from Japanese Patent Application JP 2012-278310 filed on Dec. 20, 2012, the content of which is hereby incorporated by reference into this application.

BACKGROUND

The present invention relates to a display device, and more particularly, to a liquid crystal display device or an organic EL display device capable of detecting the degree of a crack in a cutting-plane line of a glass substrate, and an impact of the crack.

The liquid crystal display device includes a TFT substrate having pixel electrodes and thin film transistors (TFT) formed in a matrix, and a counter substrate having a black matrix or an overcoat film formed at a location corresponding to the pixel electrode of the TFT substrate. The liquid crystal is interposed between the TFT substrate and the counter substrate. Images are formed by controlling light transmittance of the liquid crystal molecules for each pixel.

Especially, the liquid crystal display devices of medium and small sizes are strongly demanded to expand the display region while keeping the designed outer shape. In this case, the width defined by edges of the display region and a liquid crystal display panel, that is, a frame region is reduced. It is necessary to provide wirings such as scanning lines, video signal lines, and common wirings at an outer side of the display region. In order to ensure the aforementioned wiring region, the wiring has to be provided to the lower area of the sealing material for bonding the TFT substrate and the counter substrate.

Manufacturing the liquid crystal display devices of medium and small sizes one by one is disadvantageous in terms of cost. For this reason, the manufacturing process includes the step of forming a plurality of liquid crystal display devices on a large board, and separating the completed liquid crystal display devices respectively. In other words, a plurality of TFT substrates are formed on a large mother TFT board, and a plurality of counter substrates are formed on a large mother counter board. The mother TFT board and the mother counter board are bonded with each other to constitute a mother board. The resultant mother board is subjected to scribing, and is exposed to the impact for fracture so as to separate the board into the respective liquid crystal display panels.

When the glass is subjected to fracture, a crack may occur in an area around the liquid crystal display panel. If the panel has the small frame and wiring such as the leader is formed at the area around the edge of the liquid crystal display panel, the crack may disconnect the peripheral leader. Accordingly, the wiring for detecting the crack is provided on the inner circumference of the liquid crystal display panel.

For inspecting the liquid crystal display panel, various types of inspections have to be carried out, for example, pixel lighting inspection, disconnection inspection of the wiring and the like in addition to the crack detection. A large number of inspection terminals are required in accordance with all the inspections as described above, resulting in insufficient space for the terminal portion of the liquid crystal display panel. Japanese Unexamined Patent Application Publication Nos. 2007-171993, 2008-9246, and 2009-92965 disclose the structure configured to use the switching transistor so as to reduce the number of the inspection terminals.

Figure 7:
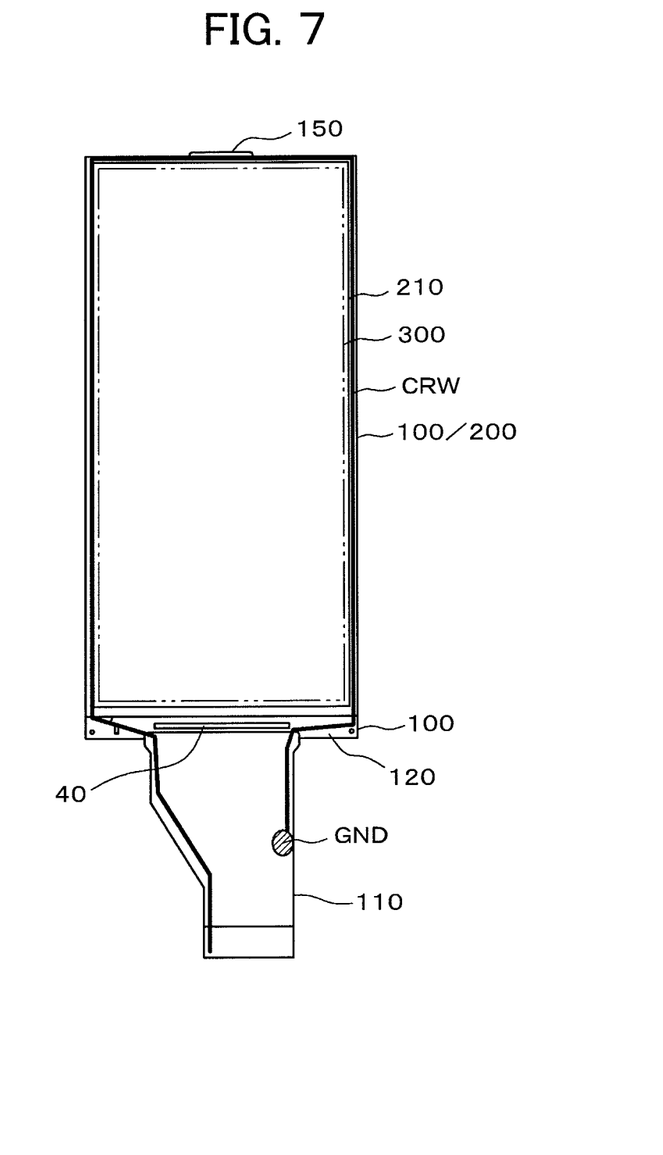
FIG. 7 illustrates an example of a liquid crystal display device to which the present invention is applied.

FIG. 7 is a plan view representing an example of a liquid crystal display device to which the present invention is applied. Referring to FIG. 7, a liquid crystal (not shown) is interposed between a TFT substrate 100 and a counter substrate 200. The TFT substrate 100 is made larger than the counter substrate 200, and an extended part of the TFT substrate is used as a terminal portion 120 on which an IC driver 40 is mounted and various terminals are formed. The terminal portion 120 is connected to a flexible wiring substrate 110.

Referring to FIG. 7, a polarizing plate 210 is bonded to the counter substrate 200. A polarizing plate 210 (not shown) is also bonded to the back surface of the TFT substrate 100. A display region 300 is formed slightly inside the polarizing plate 210. As FIG. 7 shows, a crack detection line CRW which runs along the edge side of the TFT substrate 100 is indicated by a bold line for easy identification. GND in the flexible wiring substrate 110 is a terminal for ground.

Cracks exist in all the glass substrates. The problem may occur when such crack develops to disconnect the wiring, or to deteriorate reliability of sealing between the TFT substrate 100 and the counter substrate 200. Therefore, the crack detection line CRW serves to detect whether or not the crack is larger than a predetermined size. Hereinafter, unless otherwise specified, the determination with respect to existence of the crack refers to the existence of the crack equal to or larger than a predetermined size.

Referring to FIG. 7, a current is supplied via the flexible wiring substrate 110 to detect the existence of the crack. If the crack detection line CRW is disconnected by the crack, the current is no longer applied. Therefore, it is possible to detect the existence of the crack based on the current flow.

Figure 8:
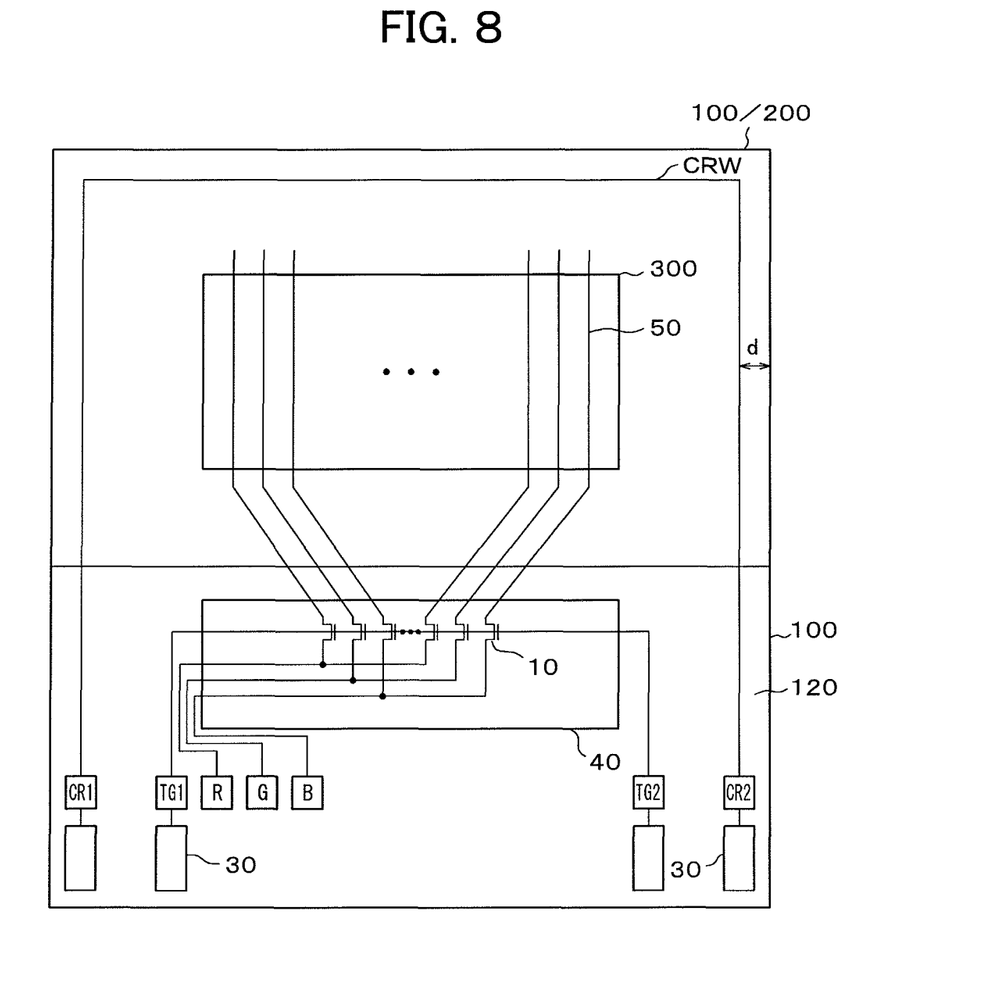
FIG. 8 is a schematic view illustrating a generally employed crack detection structure.

FIG. 8 schematically shows a generally employed crack detection circuit of the liquid crystal display device as shown in FIG. 7. FIG. 8 shows a magnified area of the terminal portion on which various terminals are formed for easy identification. Actually, the display region 300 shown in FIG. 8 has TFTs for the respective pixels. However, they are omitted for avoiding complexity. FIG. 8 omits the scanning lines. Actually, however, the scanning line is connected to the IC driver 40, and supplies the signal for turning the TFT of the pixel ON upon crack detection. If the scanning signal circuit is built in the liquid crystal display panel without using the IC driver, the scanning line is connected to the built-in scanning signal circuit.

The display region 300 is formed on the counter substrate 200 overlapped with the TFT substrate 100. The display region 300 has longitudinally extending video signal lines 50 which are transversely arranged. The video signal lines 50 are drawn to the terminal portion 120, and connected to a red pixel terminal R, a green pixel terminal G and a blue pixel terminal B, respectively via a lighting inspection switching transistor 10.

A gate line for turning the lighting inspection switching transistor 10 on/off is connected to a first test gate terminal TG1 and a second test gate terminal TG2. The lighting inspection switching transistor 10 is turned on upon lighting inspection, and off upon normal image formation. As FIG. 8 shows, the lighting inspection switching transistor 10 disposed at the same location as the IC driver 40 is actually formed on the TFT substrate 100 not on the IC driver 40.

Referring to FIG. 8, the crack detection line CRW runs along the side of the TFT substrate 100 apart from its edge by a distance of d. The distance d may be set to 200 µm, for example. If the crack becomes deeper than 200 µm, the crack detection line CRW is disconnected to block the current flow. As a result, the subject liquid crystal display panel is regarded as a defective product.

The detection method represented by FIG. 8 is required to carry out the inspection by applying the current to the crack detection line CRW. It is necessary to connect the flexible wiring substrate 110 as shown in FIG. 7 for applying the current. That is, the generally employed method is not capable of detecting the existence of the crack until the flexible wiring substrate 110 is connected.

SUMMARY OF THE INVENTION

The present invention allows detection of the crack that may cause the problem simultaneously with the lighting inspection and the like before connecting the flexible wiring substrate 110.

The present invention has been made to solve the aforementioned problem, and provides the display device configured as below.
(1) A display device is provided with a TFT substrate having a display region on which video signal lines are formed, and a terminal portion. The TFT substrate has a first side at which the terminal portion exists, a second side opposite the terminal portion, a third side at a left side of the terminal portion, and a fourth side at a right side of the terminal portion. A first crack detection terminal is provided at the third side of the terminal portion, and a second crack detection terminal is provided at the fourth side of the terminal portion. A crack detection line extends from the first crack detection terminal along the third, second and fourth sides. A first switching transistor is provided at the second side between the video signal line and the crack detection line for switching between an image display and crack detection.
(2) In the display device according to the feature (1), at the second side, the crack detection line makes a turn at a first fold-back portion around a center of the second side to extend to the third side, makes a turn at a second fold-back portion around the third side to extend to the fourth side, makes a turn at a third fold-back portion around the fourth side to extend to a position around the center of the second side, makes a turn at a fourth fold-back portion around the center of the second side to extend to a position around the fourth side, and further extends along the fourth side.

The present invention allows detection of the existence of the crack which may cause the problem before connecting the flexible wiring substrate. This makes it possible to omit the process subsequent to the crack detection for a defective product, thus reducing the manufacturing cost. The process for connecting the flexible wiring substrate to the defective panel is no longer necessary, thus further reducing the material cost.

DETAILED DESCRIPTION OF PREFERRED EMBODIMENTS

The present invention will be described in detail in reference to examples. Actually, TFTs are provided for the respective pixels in the display region 300 in FIGS. 1 to 6. However, they will be omitted in the drawing for avoiding complexity. Although the scanning lines are omitted in FIGS. 1, 2, 3, 5 and 6, they are actually provided. Such scanning line is connected to the IC driver 40, and supplies the signal for turning the TFT of the pixel on upon crack detection. If the scanning signal circuit is built in the liquid crystal display panel without using the IC driver, the scanning line is connected to the built-in scanning signal circuit.

FIRST EXAMPLE

Figure 1:
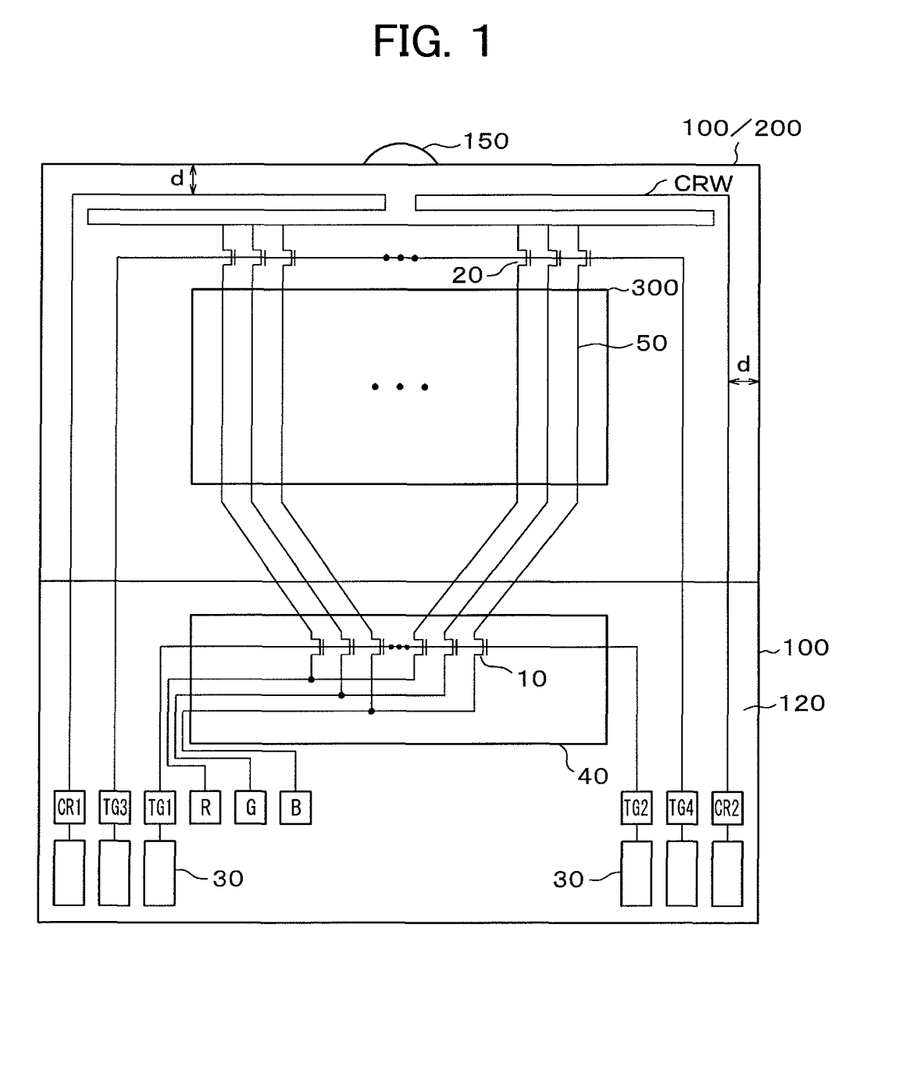
FIG. 1 is a schematic view illustrating a structure of a first example according to the present invention.

FIG. 1 schematically shows a crack detection circuit according to the example. Flexible wiring substrate terminals 30 for connecting the flexible wiring substrate 110 are provided at the outer side of inspection terminals CR1, CR2, TG1 and TG2, that is, at the lower part of the terminal portion 120 shown in FIG. 1. The terminal, wiring, circuit and the like shown in FIG. 1 for carrying out the lighting inspection are the same as those described referring to FIG. 8.

The lighting inspection is carried out by operating the lighting inspection switching transistor 10, red pixel terminal R, green pixel terminal G, blue pixel terminal B, the gate line for turning the lighting inspection switching transistor 10 on/off, the first test gate terminal TG1 and the second test gate terminal TG2. Like FIG. 8, the lighting inspection switching transistor 10 disposed at the same location as the IC driver 40 is formed on the TFT substrate 100, not on the IC driver 40.

Referring to FIG. 1, it is assumed that the lower side of the terminal portion 120 is designated as a first side, the side opposite the terminal portion 120 is designated as a second side, the left side of the terminal portion 120 is designated as a third side, and the right side of the terminal portion 120 is designated as a fourth side. The first example has a feature that a crack inspection switching transistor 20 for crack detection is formed between the display region 300 and the second side opposite the terminal portion 120. The number of the crack inspection switching transistors 20 is equal to that of the video signal lines 50. The crack inspection switching transistor 20 is controlled by the gate lines connected to the third test gate terminal TG3 and the fourth test gate terminal TG4.

As FIG. 1 shows, the crack detection line CRW runs from the first crack detection terminal CR1 formed on the terminal portion 120 to the second side along the third side, and makes a turn at a corner between the third and second sides to extend along the second side to the position around the center of the second side. The line makes a turn at a first fold-back portion around the center of the second side to extend to the third side parallel to the second side. It makes a turn at a second fold-back portion around the third side to extend to the position around the fourth side parallel to the second side again. It makes a turn at a third fold-back portion around the fourth side to extend to the position around the center of the second side parallel to the second side, and further makes a turn at a fourth fold-back portion around the center of the second side to extend to the fourth side along the second side in parallel thereto. It makes a turn at a corner between the second and fourth sides to be connected to the second crack detection terminal CR2 on the terminal portion along the fourth side. The distance d between the edge side of the TFT substrate 100 and the crack detection line CRW at the outermost side is approximately 200 μm, which applies to the following examples.

The crack detection line CRW has the four fold-back portions to form a winding pattern around the second side in order to bypass a sealing material 150 which seals the liquid crystal at which an injection hole is formed in the liquid crystal display panel for injecting the liquid crystal at the center of the second side. Since the UV curing resin is used for forming the sealing material 150, ultraviolet rays will be shielded by the crack detection line CRW, which interferes with curing of the sealing material 150. For that reason, the crack detection line CRW is folded back at the position around the center of the second side so that the ultraviolet rays are sufficiently radiated to the sealing material 150.

As FIG. 1 shows, the crack inspection switching transistor 20 connects the crack detection line CRW along the second side to the video signal lines 50 on the display region 300. In the structure shown in FIG. 1, the on signal is applied to the third test gate terminal TG3 and the fourth test gate terminal TG4 for turning the crack inspection switching transistor 20 on. Upon application of the detection signal to the first crack detection terminal CR1, if there is no disconnection in the crack detection line CRW, the detection signal is applied to all the video signal lines 50 to light all the pixel electrodes.

If the crack occurs in the crack detection line CRW at the first side to cause disconnection, the detection signals are not applied to all the video signal lines 50, and accordingly, none of the pixels is lit. If disconnection due to the crack occurs in the crack detection line CRW at the innermost side connected to the crack inspection switching transistor 20 at the second side, the detection signal is not applied from the disconnected side to the video signal line 50 at the fourth side. None of the pixels at the fourth side from the disconnected section of the crack detection line CRW is lit.

The detection signal is applied to the first crack detection terminal CR1 so as to detect the existence of the crack in the line at the third and the second sides. Even if disconnection occurs in the crack detection line CRW other than the section along the third side, the one with the winding pattern at the second side around the third side, and the one at the innermost side, all the pixels are lit. It is therefore impossible to detect the crack in the aforementioned sections.

Referring to FIG. 1, the second crack detection terminal CR2 is provided on the terminal portion 120. When the detection signal is applied to the second crack detection terminal CR2, it is possible to detect the disconnection which occurs in the crack detection line CRW along the fourth side, the one with the winding pattern at the second side around the fourth side, and the one at the innermost side. This makes it possible to detect the disconnection in all sections of the crack detection line CRW along the second to the fourth sides, which allows detection of existence of the crack.

The present invention is configured to provide the crack detection terminals at both ends of the terminal portion 120 so as to allow detection of the crack in the crack detection line along the second, third and fourth sides. The present invention provides the advantage which allows detection of existence of the crack by using the video signal lines 50 to light the pixel.

The pixel is lit through voltage driving, and a relatively low current is applied. Therefore, the inspection may be carried out using the inspection terminals CR1, CR2, TG3 and TG4 like the generally employed lighting inspection without connecting the flexible wiring substrate 110. When the crack is detected in the inspection process for crack detection carried out in advance, the panel with the detected crack does not have to be fed to the subsequent process. This may eliminate the need of carrying out the unnecessary process, thus reducing the manufacturing cost.

When detecting a crack, the OFF signal is applied to the first test gate terminal TG1 and the second test gate terminal TG2 so that the lighting inspection switching transistor 10 is turned off. Conversely, when inspecting lighting, the crack inspection switching transistor 20 for crack detection is turned off. The crack may be detected in the similar way to the generally employed lighting inspection.

The flexible wiring substrate terminals 30 at the outer side of the inspection terminals CR1, CR2, TG3 and TG4, in other words, below the inspection terminals as shown in FIG. 1 are connected to the first to the fourth test gate terminals TG1, TG2, TG3, TG4, the first crack detection terminal CR1, and the second crack detection terminal CR2, respectively. When manufacturing of the liquid crystal display device is finished, and a normal video signal is applied thereto, the off signal is applied to the first to the fourth test gate terminals TG1 to TG4, and the first and the second crack detection terminals CR1 and CR2 may be made ground potential.

The flexible wiring substrate terminals 30 connected to the first crack detection terminal CR1 and to the second crack detection terminal CR2 on the terminal portion shown in FIG. 1 are available as terminals used by a manufacturer of assembled products for inspection to determine whether the crack has developed after connecting the flexible wiring substrate 110.

SECOND EXAMPLE

Figure 2:
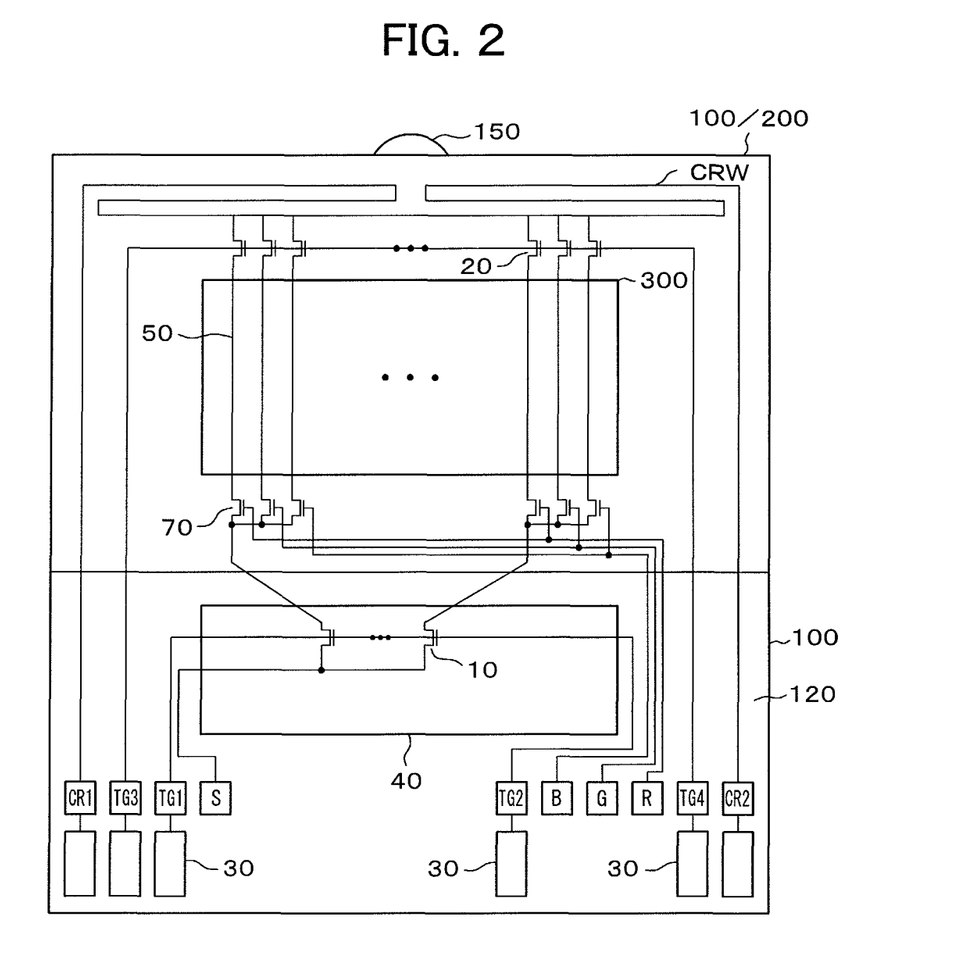
FIG. 2 is a schematic view illustrating a structure of a second example according to the present invention.

FIG. 2 schematically shows a crack detection circuit according to the second example of the present invention. The crack detection method according to the example is similar to that of the first example. This example is different from the first example in the method of displaying the image. Specifically, as definition of the screen becomes higher, the number of the video signal lines 50 is increased. Correspondingly, the number of leaders of video signal lines is increased as well, which causes the problem of the cost increase of the IC driver 40 and deteriorated reliability of the connection terminal owing to the increased terminals of the IC driver 40. Also the space of the terminal portion 120 which receives extended leaders of the video signal lines becomes insufficient.

As for the operation of the example, third switching transistors 70 are provided between the lighting inspection switching transistor 10 and the display region 300 to divide the single scanning period into three sections. Then the red, green and blue pixels are scanned independently for writing the image signal. As a result, the number of the leaders of the video signal lines may be reduced to ⅓. Meanwhile, the number of the scanning lines is increased three times. However, the decrease in the number of the video signal lines 50 is larger than the increase in the number of the scanning lines. In the end, the number of the leaders is reduced as a whole.

Referring to FIG. 2, a source of the lighting inspection switching transistor 10 is connected to a source terminal S. The drain line of the lighting inspection switching transistor 10, that is, the number of the leaders of the video signal lines is ⅓ of the number of the video signal lines 50 on the display region 300. Gate electrodes of the third switching transistors 70 are connected to the red pixel terminal R, the green pixel terminal G and the blue pixel terminal B for the respective colors.

Use of the video display method or the liquid crystal display device for lighting inspection ensures the crack inspection similar to the one described in the first example. In other words, the crack detection line CRW extends from the first crack detection terminal CR1 along the section from the third side to the second side. The line along the second side has the winding pattern like the first example, and further extends to the fourth side to be connected to the second crack detection terminal CR2.

The determination is made whether or not the crack which may cause the problem exists in the TFT substrate 100 by applying the voltage to the first crack detection terminal CR1, and then to the second crack detection terminal CR2 so as to detect disconnection in all sections of the crack detection line CRW, that is, existence of the crack failure. The respective functions of the test gate terminals TG1 to TG4 and the flexible wiring substrate terminals 30 are similar to those described in the first example.

THIRD EXAMPLE

Figure 3:
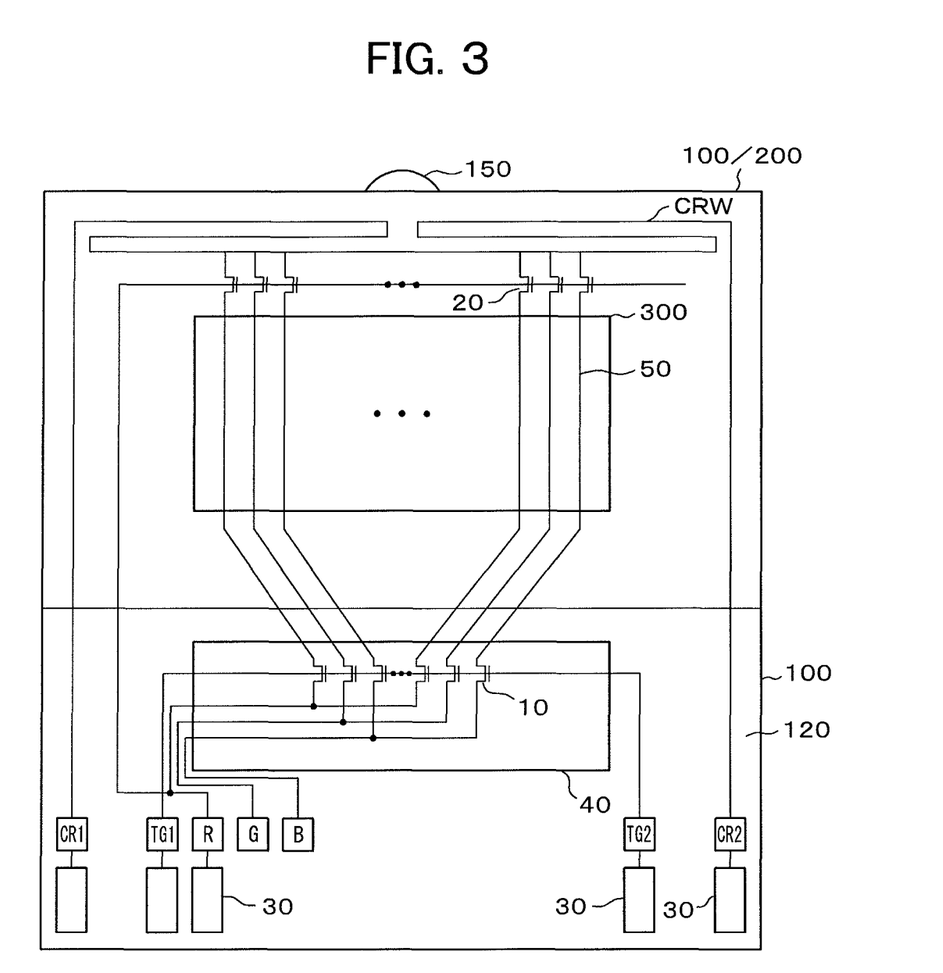
FIG. 3 is a schematic view illustrating a structure of a third example according to the present invention.

FIG. 3 schematically shows a crack detection circuit according to the third example of the present invention. Basically, the crack detection method of this example is similar to the first example. The first example is configured to connect the gate of the crack inspection switching transistor 20 to the third test gate terminal TG3 and the fourth test gate terminal TG4. In this example, the third and the fourth test gate terminals do not exist. The gate of the crack inspection switching transistor 20 is connected to the red pixel terminal R which is connected to the source of the lighting inspection switching transistor 10.

This example is allowed to omit the third and fourth test gate terminals, thus saving the space of the terminal portion 120. When the crack inspection switching transistor 20 is turned on for crack detection, the ON signal is applied to the red pixel terminal R. At this time, the lighting inspection switching transistor 10 is in OFF state, which gives no influence on the operation of the lighting inspection even if the ON signal is applied to the red pixel terminal R.

Referring to FIG. 3, the gate of the crack inspection switching transistor 20 is connected to the red pixel terminal R for lighting inspection. However, the similar operation may be obtained by connecting the gate to the green pixel terminal G or the blue pixel terminal B. The crack detection as indicated by FIG. 3 is similar to the detection described in the first example, and an explanation thereof, thus will be omitted.

FOURTH EXAMPLE

Figure 4:
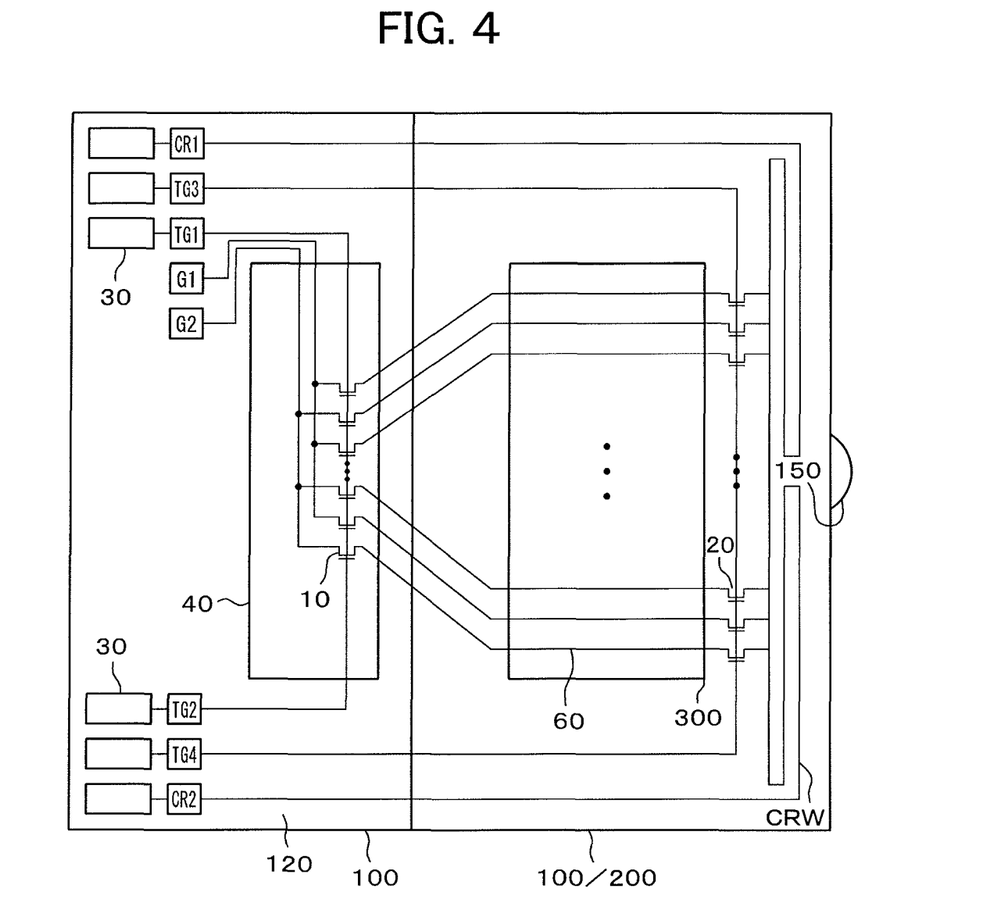
FIG. 4 is a schematic view illustrating a structure of a fourth example according to the present invention.

FIG. 4 schematically shows a crack detection circuit according to the fourth example of the present invention. Unlike the liquid crystal display device described in the first to the third examples, the liquid crystal display device of this example has the terminal portion 120 transversely arranged. The liquid crystal display device thus arranged may be employed for a digital still camera (DSC), for example.

Referring to FIG. 4, it is assumed that the left side of the terminal portion 120 is designated as the first side, the side opposite the terminal portion 120 is designated as the second side, the upper side is designated as the third side, and the lower side is designated as the fourth side. As FIG. 4 shows, the scanning lines 60 transversely extend on the display region 300. The drain of the lighting inspection switching transistor 10 for lighting inspection is connected to the scanning line 60. A source wire is connected to a first scanning terminal G1 or a second scanning terminal G2 on the terminal portion.

FIG. 4 omits the video signal lines for simplification. Actually, however, the video signal lines exist in the display region 300, and are connected to the IC driver 40. Upon crack detection, the video signal for detection is supplied from the IC driver 40.

Referring to FIG. 4, the source of the crack inspection switching transistor 20 for crack detection is connected to the scanning line 60, and the drain is connected to the crack detection line CRW. Upon crack detection, the OFF signal is supplied to the first test gate terminal TG1 and the second test gate terminal TG2 which are connected to the gate of the lighting inspection switching transistor 10. The ON signal is supplied to the third test gate terminal TG3 and the fourth test gate terminal TG4 to turn the crack inspection switching transistor 20 on. Then it is determined whether or not disconnection occurs in the crack detection line CRW so as to detect the crack that may cause the problem.

In this case, the detection signal is applied separately from the first crack terminal CR1 and the second crack terminal CR2 at different times to detect whether or not the pixel on the display region 300 is lit. Like the first example, this example allows detection of the crack over the whole sections of the line. In this way, the present invention may be applied with no problem to the structure of this example configured to connect the crack inspection switching transistor 20 connected to the crack detection line CRW to the scanning line 60 on the display region 300.

FIFTH EXAMPLE

Figure 5:
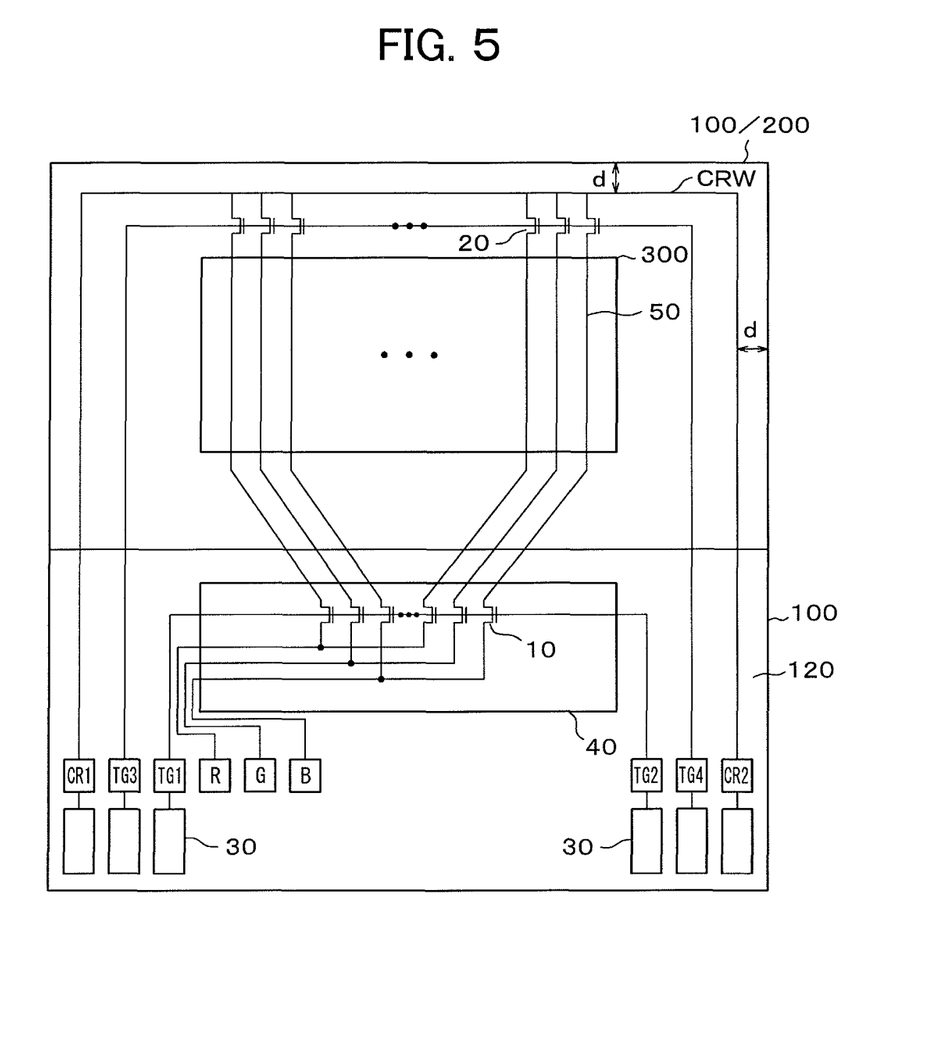
FIG. 5 is a schematic view illustrating a structure of a fifth example according to the present invention.

FIG. 5 schematically shows a crack detection circuit according to the fifth example of the present invention. This example is substantially the same as the first example except that the crack detection line CRW at the second side opposite the terminal portion 120 has a different pattern. Unlike FIGS. 1 to 4, the sealing material 150 does not exist at the second side in FIG. 5.

The method for injecting the liquid crystal to the liquid crystal display panel includes the one for injecting the liquid crystal through the injection hole, and the one for dropping the liquid crystal onto the counter substrate 200 for sealing before bonding the TFT substrate 100 and the counter substrate 200 with the adhesive (One Drop Fill, ODF). The ODF method for injecting the liquid crystal does not require any sealing hole and sealing material 150. Accordingly, the crack detection line does not have to be bypassed around the center of the second side so as not to interfere with UV radiation to the sealing material 150 as the UV curing material. This example allows the crack detection line CRW to have the simple straight pattern at the second side.

Referring to FIG. 5, the crack detection line CRW extends from the first crack detection terminal CR1 on the terminal portion 120 along the inner circumference of the third side, and makes a turn at the area around the second side to extend therealong. The line makes a turn at the area around the fourth side to extend therealong so as to be connected to the second crack detection line CR2 on the terminal portion 120. Unlike the first to the fourth examples, the crack detection line CRW along the second side is formed as one single straight line with no winding pattern.

The crack detection line CRW along the second side as one single straight line functions for crack detection in the similar manner to the line as described in the first example. The explanation with respect to the operation of this example, thus, will be omitted. The structure having the crack detection line CRW along the second side as the straight line may apply to the crack detection method as described in the second to the fourth examples.

SIXTH EXAMPLE

Figure 6:
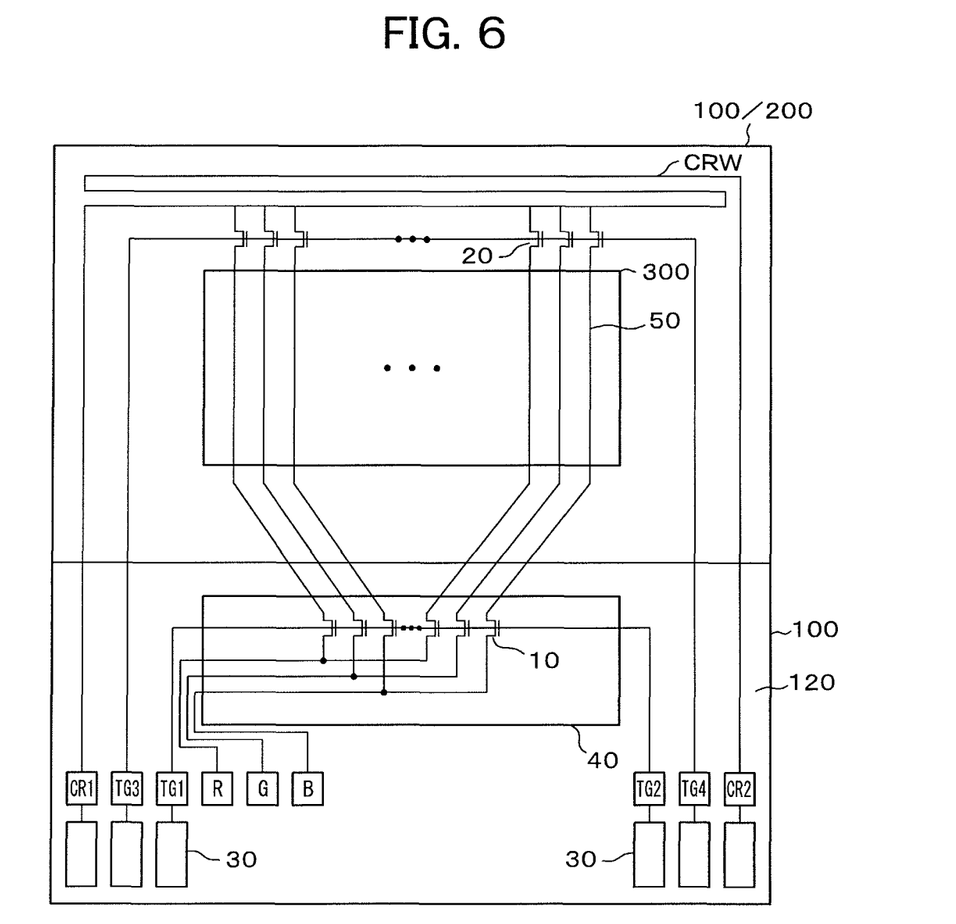
FIG. 6 is a schematic view illustrating a structure of a sixth example according to the present invention.

FIG. 6 schematically shows the crack detection circuit according to the sixth example of the present invention. The example is substantially the same as the first example except that the crack detection line CRW at the second side opposite the terminal portion 120 has a different pattern from the one described in the first example. Like the fifth example, the circuit shown in FIG. 6 has no sealing material 150 at the second side. This example is applied to the liquid crystal display device of ODF type.

The crack detection line CRW with the winding pattern along the second side is formed through folding back at the positions around the third and the fourth sides rather than at the position around the center of the second side. The line with the aforementioned winding pattern may be used as the shielding film or the means for planarizing the sealing portion relative to the other wire.

The crack detection line CRW at the second side having the winding pattern as shown in FIG. 6 ensures the crack detection in the similar way to the detection as described in the first example. The explanation with respect to the crack detection method, thus, will be omitted. The crack detection line CRW at the second side as shown in FIG. 6 may be applied to the crack detection method as described in the second to the fourth examples.

The explanations have been made so far, taking up the liquid crystal display device as the example. However, the present invention may be applied to the organic EL display device as well.

What is claimed is:

1. A display device with a TFT substrate having a display region on which video signal lines are formed, and a terminal portion,
   wherein the TFT substrate has a first side at which the terminal portion exists, a second side opposite the terminal portion, a third side at a left side of the terminal portion, and a fourth side at a right side of the terminal portion;
   a first crack detection terminal is provided at the third side of the terminal portion, and a second crack detection terminal is provided at the fourth side of the terminal portion;
   a crack detection line extends from the first crack detection terminal along the third, second and fourth sides; and
   a first switching transistor is provided at the second side between the video signal line and the crack detection line for switching between an image display and crack detection,
   wherein at the second side, the crack detection line makes a turn at a first fold-back portion around a center of the second side to extend to the third side, makes a turn at a second fold-back portion around the third side to extend to the fourth side, makes a turn at a third fold-back portion around the fourth side to extend to a position around the center of the second side, makes a turn at a fourth fold-back portion around the center of the second side to extend to a position around the fourth side, and further extends along the fourth side.

2. The display device according to claim 1, wherein a gate of the first switching transistor is controlled by a signal applied to a test gate terminal formed on the terminal portion.

3. The display device according to claim 1, wherein the terminal portion includes a second switching transistor for switching between the image display and a lighting inspection;
   a source of the second switching transistor includes a red pixel terminal, a green pixel terminal or a blue pixel terminal which are formed on the terminal portion; and
   a gate of the first switching transistor is connected to any one of the red pixel terminal, the green pixel terminal and the blue pixel terminal.

4. The display device according to claim 1,
   wherein the terminal portion includes a second switching transistor for switching between an image display and a lighting inspection;
   a third switching transistor is provided between the display region and the second switching transistor, and configured to receive an input of a video signal line, and a lead wire is connected from third switching transistor to the second switching transistor; and
   the number of the lead wires is ⅓ of the number of the video signal lines.

5. A display device with a TFT substrate having a display region on which scanning lines are formed, and a terminal portion,
   wherein the TFT substrate has a first side at which the terminal portion exists, a second side opposite the terminal portion, a third side at a left side of the terminal portion, and a fourth side at a right side of the terminal portion;
   a first crack detection terminal is provided at the third side of the terminal portion, and a second crack detection terminal is provided at the fourth side of the terminal portion;
   a crack detection line extends from the first crack detection terminal along the third, second and fourth sides;
   a first switching transistor is provided at the second side between the scanning line and the crack detection line for switching between an image display and crack detection; and
   wherein at the second side, the crack detection line makes a turn at a first fold-back portion around a center of the second side to extend to the third side, makes a turn at a second fold-back portion around the third side to extend to the fourth side, makes a turn at a third fold-back portion around the fourth side to extend to a position around the center of the second side, makes a turn at a fourth fold-back portion around the center of the second side to extend to a position around the fourth side, and further extends along the fourth side.

6. The display device according to claim 5, wherein a gate of the first switching transistor is controlled by a signal applied to a test gate terminal formed on the terminal portion.

7. The display device according to claim 5,
wherein the terminal portion includes a second switching transistor for switching between the image display and a lighting inspection;
a source of the second switching transistor includes a red pixel terminal, a green pixel terminal, or a blue pixel terminal which is formed on the terminal portion; and
a gate of the first switching transistor is connected to any one of the red pixel terminal, the green pixel terminal and the blue pixel terminal.

* * * * *